(12) United States Patent
Braunschweiler et al.

(10) Patent No.: US 11,445,332 B2
(45) Date of Patent: Sep. 13, 2022

(54) LOCATION-BASED INTERACTIVE STORYTELLING

(71) Applicant: Disney Enterprises, Inc., Burbank, CA (US)

(72) Inventors: Manuel Braunschweiler, Zurich (CH); Steven Poulakos, Zurich (CH); Mattia Ryffel, Bern (CH); Robert W. Sumner, Zurich (CH)

(73) Assignee: Disney Enterprises, Inc., Burbank, CA (US)

( * ) Notice: Subject to any disclaimer, the term of this patent is extended or adjusted under 35 U.S.C. 154(b) by 92 days.

(21) Appl. No.: 17/118,147

(22) Filed: Dec. 10, 2020

(65) Prior Publication Data

US 2021/0274314 A1    Sep. 2, 2021

Related U.S. Application Data

(60) Provisional application No. 62/983,418, filed on Feb. 28, 2020.

(51) Int. Cl.

| | |
|---|---|
| *H04W 4/02* | (2018.01) |
| *H04W 4/029* | (2018.01) |
| *H04W 4/021* | (2018.01) |
| *H04N 21/8541* | (2011.01) |
| *H04N 21/8545* | (2011.01) |

(52) U.S. Cl.
CPC ........ *H04W 4/029* (2018.02); *H04N 21/8541* (2013.01); *H04N 21/8545* (2013.01); *H04W 4/021* (2013.01); *H04W 4/023* (2013.01)

(58) Field of Classification Search
CPC ..... H04W 4/029; H04W 4/021; H04W 4/023; H04N 21/8541; H04N 21/8545
See application file for complete search history.

(56) References Cited

U.S. PATENT DOCUMENTS

| | | | |
|---|---|---|---|
| 2018/0040163 A1* | 2/2018 | Donnelly | ........... G01C 21/3647 |
| 2019/0095392 A1* | 3/2019 | Ananthan | ........ H04N 21/43074 |

(Continued)

OTHER PUBLICATIONS

"D3.9: FMI Vision, Use Cases and Scenarios V2" by Poulakos et al. (DRZ 2018-2019).

(Continued)

*Primary Examiner* — Dai Phuong
(74) *Attorney, Agent, or Firm* — Farjami & Farjami LLP

(57) ABSTRACT

A storytelling system includes location-based content (LBC) servers and LBC effects databases for use in a real-world story venue, and a computing platform communicatively coupled to those LBC servers and databases. A processor of the computing platform executes software code to receive story selection data from a user device, obtain a story template including story arcs each associated with one or more LBC effect(s) that corresponds to the story selection data, and determine, using a location of the user device, one of the story arcs as an active story arc. The software code also identifies an LBC interaction zone for the LBC effect(s), designates one LBC server and one LBC effects database for supporting the active story arc, and distributes one or more of the LBC effect(s) to the designated database. The designated server enables instantiation of the one or more of the LBC effect(s) at the LBC interaction zone.

20 Claims, 7 Drawing Sheets

(56) References Cited

U.S. PATENT DOCUMENTS

2020/0296317 A1\*　9/2020　Post, Jr. ............... H04N 7/0122
2022/0028426 A1\*　1/2022　Park ......................... H04N 5/76
2022/0060802 A1\*　2/2022　Richter ................. G06V 20/20

OTHER PUBLICATIONS

"About—Story City" (Story City 2021) https://www.storycity.com.au/.
"How To Use Story City" (YouTube 2021) https://www.youtube.com/watch?v=t0bmuHzkrrA.
"About—Flame" (Flame 2021) https://www.ict-flame.eu/flame/.

\* cited by examiner

LOCATION-BASED INTERACTIVE STORYTELLING

RELATED APPLICATION(S)

The present application claims the benefit of and priority to a U.S. Provisional Patent Application Ser. No. 62/983,418, filed Feb. 28, 2020, and titled "Location-Based Interactive AR Storytelling," which is hereby incorporated fully by reference into the present application.

BACKGROUND

A significant challenge for immersive mixed reality storytelling is how to structure and manage a story arc that adapts to user interactions with both the digital and physical features of the story world. A particularly challenging issue is how to author and deliver location-based stories where virtual content is delivered and instantiated based on location-based interactions. For example, the content may include a character from a movie, and it may be desirable to present that character to users of a real-world story venue and enable the users to walk around the virtual character and to trigger the presentation of additional location-based content by interacting with the virtual character or real-world story venue.

Some conventional solutions to the challenge of providing an interactive character utilize a robotic figure to try to achieve the desired effect. However, such robotic figures can be challenging to design and costly to maintain, and may nevertheless not ultimately be capable of credibly replicating some characters, particularly animations. Consequently, there remains a need in the art for solutions for providing location-based content including interactive characters, or the illusion of the presence of such characters, within a real-world story venue in which one or more users may be present.

DETAILED DESCRIPTION

Figure 1A:
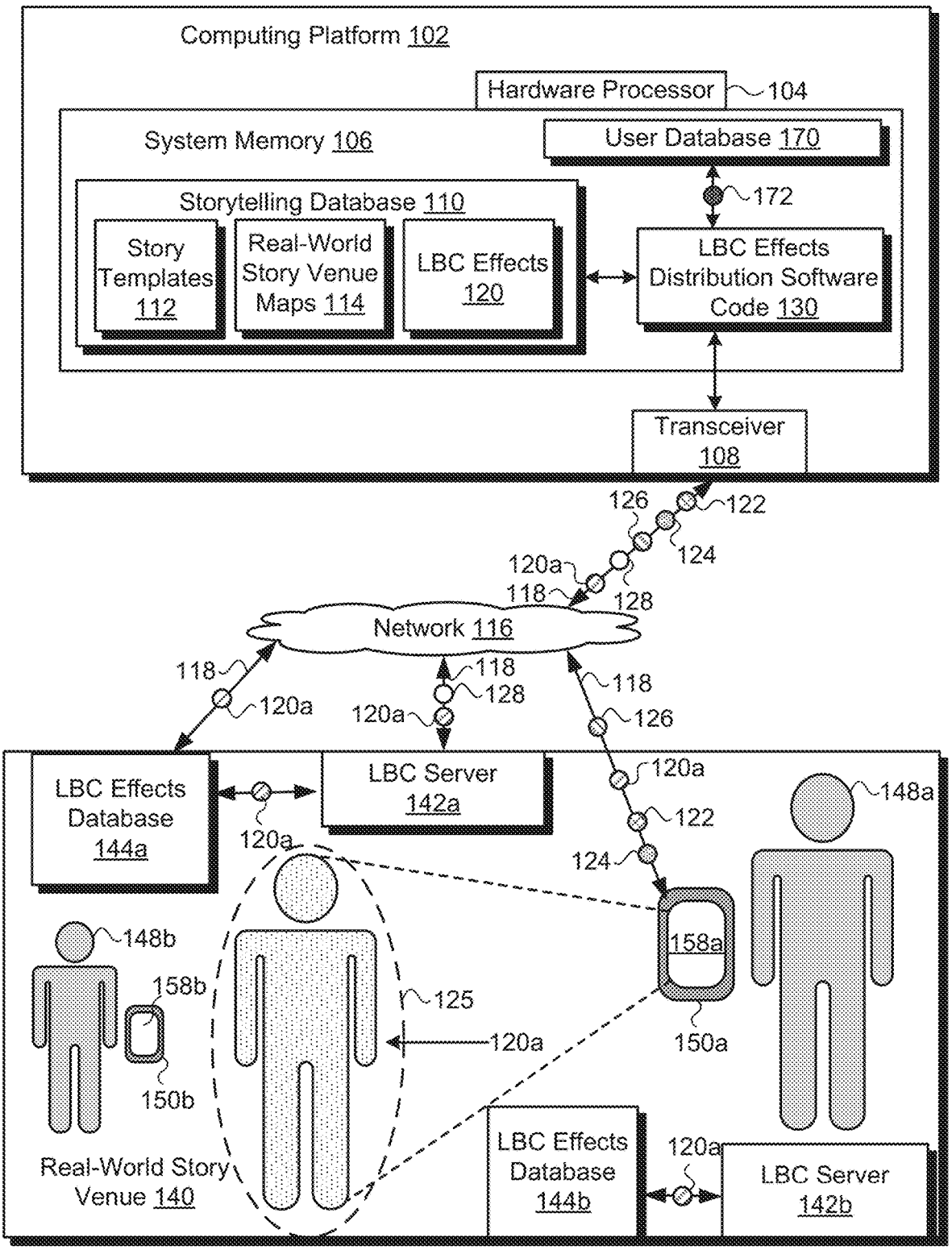
FIG. 1A shows a diagram of an exemplary location-based interactive storytelling system, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses location-based interactive storytelling systems and methods that overcome the drawbacks and deficiencies in the conventional art. A location-based storytelling system architecture of the present disclosure makes it possible for a mobile client application to efficiently stream one or more digital assets (hereinafter "location-based content effects" or "LBC effects") only when required. A three-dimensional (3D) story can be visualized on a mobile device and acted out on virtual LBC stages (hereinafter "location-based content interaction zones" or "LBC interaction zones") that are anchored at specific physical locations within a real-world story venue. The mobile client application communicates with a computing platform of the system to request a story template including multiple story arcs each associated with an LBC effect or effects. The mobile client can then acquire one or more of the LBC effects and other media associated with the story when contextually appropriate, for example, when the user is physically near an LBC interaction zone.

The storytelling system computing platform manages all data related to stories, users, and user behaviors (e.g., location-based interactions). The storytelling system offers multiple forms of location-based interaction to trigger the acquisition of location-specific content, to trigger the visibility of LBC effects, and to trigger proximity based interactions with smart effects in the form of virtual characters and objects, as defined below. A story structure has been developed to author and deliver a location-based interactive story that adapts to the user's location-based interactions with both the digital and physical world. In some implementations, the storytelling system computing platform is configured to orchestrate localized services that provide low latency state synchronization to enable multiple users to have a shared story experience. The present location-based interactive storytelling solution is capable of delivering multiple stories, which do not need to be related to each other, substantially concurrently, such that each story can be considered a game or interactive experience onto itself. The present approach to narrative generation can advantageously be utilized to explicitly guide one or more users to physical locations, as well as, in some implementations, to predict user movement. The location-based interactive storytelling solution disclosed by the present application may advantageously be utilized in a wide variety of use cases such as augmented reality (AR) games, interactive stories and plays, tourism, theme park experiences, urban navigational assistance, and immersive educational presentations, to name a few examples.

It is noted that, as used herein, the feature "LBC effects" may include any of a variety of effects that are contextually relevant both to a particular story arc and the physical location of a user within a real-world story venue. LBC effects may include "smart effects", as well as multi-media effects that are herein defined to include images, video content, text, audio content, and haptic effects. Smart effects, as defined for the purposes of the present application, refer to LBC effects that can trigger or influence other LBC effects. For example, interaction by a user with a smart effect can trigger instantiation of another LBC effect, may change the appearance or position of a presently instantiated LBC effect, or may determine a future LBC effect instantiated at another location. Smart effects may take the form of interactive two-dimensional (2D) or 3D virtual characters depicting persons, avatars, animations, caricatures of a person, or animals, or may be presented as smart objects with which a user can interact such as costumes, weapons, furnishings, or structural/architectural features of a venue. In some use cases, LBC effects may include one or more augmented AR effects, where AR effects can refer to one or more virtual images used to overlay an image of a real-world object.

It is further noted that, in some implementations, the storytelling systems and methods disclosed by the present application may be substantially or fully automated. As used in the present application, the terms "automation," "automated," and "automating" refer to systems and processes that do not require the participation of a human system operator. Although, in some implementations, a human system operator or administrator may review the performance of the automated systems and according to the automated methods described herein, that human involvement is optional. Thus, the methods described in the present application may be performed under the control of hardware processing components of the disclosed automated storytelling systems.

FIG. 1A shows a diagram of an exemplary location-based interactive storytelling system, according to one implementation. Storytelling system 100A includes computing platform 102 having hardware processor 104, system memory 106 implemented as a non-transitory storage device, and transceiver 108. According to the exemplary implementation depicted in FIG. 1A, system memory 106 stores LBC effects distribution software code 130, storytelling database 110, and user database 170 providing user model 172. Moreover, as shown in FIG. 1A, storytelling database 110 includes story templates 112, real-world story venue maps 114, and LBC effects 120. As further shown in FIG. 1A, storytelling system 100A also includes LBC servers 142a and 142b, and LBC effects databases 144a and 144b, each for use in real-world story venue 140 including LBC interaction zone 125.

In addition, FIG. 1A shows users 148a and 148b of storytelling system 100A, user devices 150a and 150b utilized by respective users 148a and 148b to interact with storytelling system 100A, as well as LBC effects 120a distributed by computing platform 102, obtained from LBC effects database 144a by LBC server 142a, instantiated by LBC server 142a in LBC interaction zone 125. Also shown in FIG. 1A are story selection data 122, location data 124, and input 126 received by computing platform 102 from user device 150a, displays 158a and 158b of respective user devices 150a and 150b, viewer perspective data 128, and network 116 and network communication links 118 communicatively coupling computing platform 102 to LBC server 142a, LBC effects database 144a, and user device 150a.

It is noted that although FIG. 1A does not explicitly show network 116 and network communication links 118 communicatively coupling LBC server 142b, LBC effects database 144b, and user device 150b to computing platform 102 via network 116 in the interests of limiting visual clutter, LBC server 142b, LBC effects database 144b, and user device 150b, like LBC server 142a, LBC effects database 144a, and user device 150a, are in fact communicatively coupled to computing platform 102 by network 116 and network communication links 118. Thus, in some implementations, user device 150b may transmit one or more of story selection data 122, location data 124, and input 126 to computing platform 102, and receive LBC effects 120a via network 116, while LBC effects database 144b and LBC server 142b may receive LBC effects 120a via network 116.

It is further noted that although FIG. 1A shows two LBC servers, two LBC data effects databases, and two users using two respective user devices, that representation is also merely exemplary. In other implementations, as few as one LBC server and one LBC effects database may be provided for use in real-world story venue 140, or more than two LBC servers and two LBC effects databases may be provided for such use, while in other implementations, fewer, or more, than two users may utilize storytelling system 100A. Moreover, where two or more users utilize storytelling system 100A, their use may be concurrent, and may include concurrent interaction with the same active story arc of the same story template, or may include concurrent interaction with entirely different story templates.

It is also noted that although FIG. 1A shows a single LBC interaction zone, it is contemplated that in many implementations real-world story venue 140 includes multiple LBC interaction zones. Consequently, LBC interaction zone 125 corresponds to the presence of one, or more than one LBC interaction zone within real-world story venue 140. Real-world story venue 140 may take the form of an outdoor or otherwise open air venue. Such venues may include a museum property, a theme park, a historical site, or an urban site such as a city block, square, or park at which an LBC interaction zone has been defined, to name a few examples. Alternatively, in some implementations, real-world story venue 140 may be an indoor venue, such as a museum building, library, theater, concert hall, or other event center, for example. It is noted that although FIG. 1A explicitly shows LBC effects 120a as an image of a single character, that simplified representation is provided merely for conceptual clarity. More generally, LBC effects 120a may include one or more AR effects producing images of characters, which may be life-size, and may be walking or otherwise ambulatory. In addition, LBC effects 120a may include 2D or 3D props, such as historical or modern clothing or other attire, weaponry, vehicles, and structures, for example. Moreover, LBC effects 120a may include one or more of still images, video content, audio content, or text.

Although FIG. 1A depicts LBC effects distribution software code 130, storytelling database 110, and user database 170 as being stored in system memory 106, that representation too is merely exemplary. More generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1A depicts LBC effects distribution software code 130, storytelling database 110, and user database 170 as being co-located in system memory 106, that representation is also merely provided as an aid to conceptual clarity. More generally, storytelling system 100A may include one or more computing platforms 102, such as computer servers for example, which may be co-located, or may form an interactively linked but distributed system, such as a cloud-based system, for instance. As a result, hardware processor 104 and system memory 106 may correspond to distributed processor and memory resources within storytelling system 100A.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. Consequently, in some implementations, LBC effects distribution software code 130, storytelling database 110, and user database 170 may be stored remotely from one another on the distributed memory resources of storytelling system 100A.

As shown in FIG. 1A, in some implementations, user devices 150a and 150b may take the form of smartphones or tablet computers. Alternatively, in some implementations, one or more of user devices 150a and 150b may take the form of a wearable personal communication device, such as an AR headset or glasses, a smartwatch, or another smart personal item worn or carried by respective users 148a and 148b.

In some implementations, computing platform 102 may identify the locations of user devices 150a and 150b by receiving location data 124 including position and orientation information from user devices 150a and 150b via network 116 and network communication links 118, where location data 124 may describe the respective location, yaw, pitch, and roll of each of user devices 150a and 150b. With respect to displays 158a and 158b of respective user devices 150a and 150b, displays 158a and 158b may take the form of liquid crystal displays (LCDs), light-emitting diode (LED) displays, organic light-emitting diode (OLED) displays, quantum dot (QD) displays, or any other suitable display screen that performs a physical transformation of signals to light.

In some implementations, storytelling system 100A may be configured to track user devices 150a and 150b to determine the location and orientation of user devices 150a and 150b in real-world story venue 140 independently of location data 124. For example, in some implementations, storytelling system 100A may include one or more tracking devices (tracking device or devices not shown in FIG. 1A) in the form of a camera, camera array, or one or more other type of optical sensor for determining the location and orientation of user devices 150a and 150b in real-world story venue 140. Alternatively, or in addition, such tracking devices may include multiple components distributed within real-world story venue 140 and configured to perform radio-signal triangulation to determine the location and orientation of user devices 150a and 150b. As yet another alternative, or additionally, storytelling system 100A may be configured to perform simultaneous localization and mapping (SLAM) to determine the location and orientation of user device 150a and 150b in real-world story venue 140.

In addition to determining the location and orientation of user devices 150a and 150b in real-world story venue 140, storytelling system 100A may further determine the viewing perspective of users 148a and 148b of respective user devices 150a and 150b. For example, in some implementations, storytelling system 100A may be configured to perform eye tracking or skeleton tracking of users 148a and 148b in real-world story venue 140. Alternatively, or in addition, location data 124 received from user devices 150a and 150b may enable LBC effects distribution software code 130, executed by hardware processor 104 of computing platform 102, to estimate the viewing perspective of users 148a and 148b.

By way of overview, in some implementations, storytelling system 100A enables visualization, on user devices 150a and 150b, of a 3D story corresponding to story selection data 122 and acted out on virtual stages corresponding to LBC interaction zone 125. Each LBC interaction zone 125 is anchored at a specific location within real-world story venue 140, for example via one or more localizing technologies such as Global Positioning System (GPS), Bluetooth beacons, AR markers, Ground Plane detection, and other techniques for anchoring virtual content in the physical environment. Storytelling system 100A supports several forms of location-based interaction. In one location-based interaction, for example, user device location data 124 is used to trigger entering and exiting a predetermined proximity of LBC interaction zone 125. In a second location-based interaction, physical markers, such as AR markers, for example, at LBC interaction zone 125 trigger the visibility of LBC effects 120a for staging LBC interaction zone 125 and determine the orientation of LBC staging effects within real-world story venue 140. In a third interaction, Ground Plane detection techniques, such as AR Ground Plane detection, as known in the art, may be used to allow users 148a and 148b to physically walk onto or into LBC interaction zone 125, and predefined interactions can be executed when one or both of user devices 150a and 150b come within a predetermined proximity to LBC effects 120a in the form of a character or prop.

Regarding story structure, a story template may include multiple, possibly parallel, story arcs that are translated into 3D animations or trigger instantiation of other LBC effects at runtime. At the end of an active story arc with which users 148a and 148b interact, the story may branch into one of several continuation story arcs based on the actions by one or more of users 148a and 148b, or interactions by the user or users with the terminating active story arc. It is noted that an active story arc may also be interrupted based on a user interaction. In addition, users 148a and 148b can transition to a different active story arc at any time, given that the present state of the story template allows it. Restrictions imposed on transitions between story arcs are to ensure continuity of the user interaction experience when transitioning amongst story arcs.

Figure 1B:
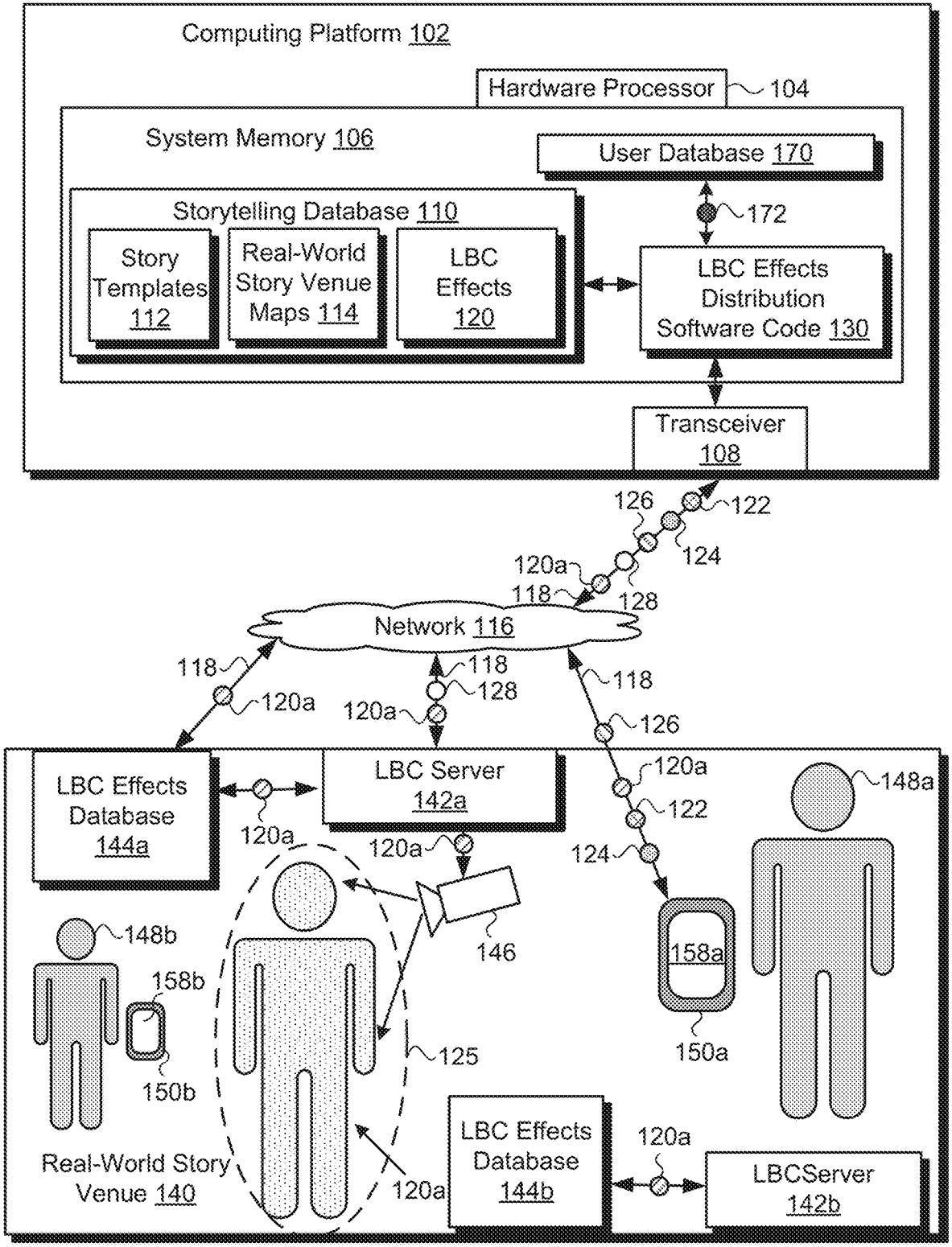
FIG. 1B shows a diagram of an exemplary location-based interactive storytelling system, according to another implementation.

The story can be authored in a way that allows progression through previously defined location-based interactions. User model 172 stored in user database 170 may be utilized to track what a user has already experienced, including interactive engagement with characters and objects. It is noted that user model 172 may include an interaction history of one of users 148a or 148b, including location-based stories that the user has previously interacted with, the present location of the user, the narrative progression of a location-based story with which the user is presently interacting, previously expressed preferences of the user, the age and gender of the user, loyalty affiliations of the user, other profiling data previously submitted by or obtained about the user, as well as inferred preferences of the user based on the interaction history and profiling data included in user model 172. User model 172 may be used to predict future movements and interests of the user, and can guide narrative progression. As a result, hardware processor 104 may advantageously execute LBC effects distribution software code 130 to utilize the story template and user model 172 (which, as noted above, may include narrative progression, as well as known and inferred user preferences) to proactively distribute LBC effects so that they may be instantiated substantially immediately when the user arrives at an LBC interaction zone. In some implementations, as shown in FIG. 1A, such proactive distribution may result in LBC effects 120*a* being delivered to user devices 150*a* and 150*b* prior to, or concurrently with, their arrival at LBC interaction zone 125. In other implementations, as shown in FIG. 1B, the proactive distribution may result in delivery of LBC effects 120*a* to display device(s) 146 in order to enable instantiation of LBC effects 120*a* at LBC interaction zone 125.

In one implementation, stories are structured into four different types of interactive behaviors:

1. Location Independent Background Behaviors provide the introduction, entry point to the story, and the story end. Location independent background behaviors can occur at any location within real-world story venue 140 and provide the highest level structure controlling story progression.
2. Location Dependent Background Behaviors occur when the user reaches LBC interaction zone 125. Location dependent background behaviors load the correct scene, provide LBC effects 120*a* to bring LBC interaction zone 125 to life, and provide interaction possibilities to enter the main story or side stories. This behavior may be authored as a graph for each LBC interaction zone individually.
3. Location Dependent Main Story Behaviors can occur if there is an active story arc available at the present location that continues the main story. The main story may be represented as one or more dependency graphs, where progress is blocked if the user is not yet at a required location. While the story is blocked, behavior reverts to the location dependent behavior of the present LBC interaction zone.
4. Location Dependent Side Stories can be experienced if the user wishes to. They are not relevant to complete the main story, but may influence how the story progresses or may convey additional information of interest to the user. Each side story may be represented as a graph and is typically bound to a specific LBC interaction zone.

User devices 150*a* and 150*b* receive LBC effects 120*a* required to instantiate a user interaction when they arrive within a predetermined proximity of LBC interaction zone 125, as determined using GPS, Bluetooth beacons, AR markers, or any other suitable localizing technology. This advantageously allows an LBC effects mobile application executed by each of user devices 150*a* and 150*b* to be lightweight. The progress of users 148*a* and 148*b* within the story template is synchronized with computing platform 102 of storytelling system 100A, which has knowledge of all presently active users and the possible story arcs, as well as the narrative progress of each active user, e.g., which story arcs and LBC interactions each user has already experienced. It is noted that possible story arcs for each active user may differ based on the user profile of that user. That is to say, based on known user preferences and a user history included in the user profile, some story arcs included in a particular template may be more likely to be engaged by the user than others.

LBC effects distribution software code 130, executed by hardware processor 104 of computing platform 102, determines which LBC effects 120*a* the user might need to receive next and preemptively places those LBC effects 120*a* at one of LBC effects database 144*a* or 144*b* based on its proximity to LBC interaction zone 125. It is noted that LBC effects distribution software code 130, executed by hardware processor 104 of computing platform 102, can remove LBC effects 120*a* from LBC effects database 144*a* or 144*b* when no active user is predicted to require it. It is further noted that, in some implementations, the logic of LBC effects distribution software code 130 is responsive to states, including states associated with the smart effects included among LBC effects 120*a*, or the states associated with the story template corresponding to story selection data 122. In those implementations, user interactions with smart effects and story arcs at locations within real-world story venue 140 can influence the story through state changes.

In some implementations, storytelling system 100A is configured to perform location-based low latency state synchronization to improve the quality of shared experiences by users 148*a* and 148*b* at LBC interaction zone 125. One approach to providing that functionality is to use client-server architectures for state synchronization, for example, analogous to client-server architectures used in multiplayer games. In some implementations, LBC servers 142*a* and 142*b* may serve as state synchronization servers configured to utilize the story template corresponding to story selection data 122 received from one or both of users 148*a* and 148*b*, as well as knowledge of multi-user behavior. The story template includes a mapping of story arcs to LBC interaction zones 125.

User movement may be predicted according to expected story experiences (e.g., based on creative intent for narrative flow or based on known user interests or preferences obtained as user model 172 from user database 170). Physical infrastructure in the form of LBC servers 142*a* and 142*b* and LBC effects databases 144*a* and 144*b* can be mapped to physical locations, such as LBC interaction zone 125, associated with the location-based narrative. For example, one of LBC servers 142*a* or 142*b* may be located near LBC interaction zone 125 for a shared story experience, and that LBC server may be configured to host a local state synchronization service. That state synchronization service may be operational according to the predicted requirements of the shared location-based story, while the prediction makes it possible to more efficiently utilize location-based resources, such as LBC effects databases 144*a* and 144*b* local to real-world story venue 140.

FIG. 1B shows a diagram of exemplary storytelling system 100B, according to another implementation. It is noted that storytelling system 100B, in FIG. 1B, corresponds in general to storytelling system 100A, in FIG. 1A, and may share any of the characteristics attributed to that corresponding system by the present disclosure. It is further noted that any feature in FIG. 1B identified by a reference number identical to a reference number appearing in FIG. 1A corresponds to that previously described feature and may share any of the characteristics attributed to it above.

In implementations in which one or more of user devices 150*a* and 150*b* lack the processing capabilities to perform low latency rendering of LBC effects 120*a* at LBC interaction zone 125, it may be advantageous or desirable for storytelling system 100B to include one or more display devices 146 (hereinafter "display device(s) 146") controlled by a respective one or more of LBC servers 142*a* and 142*b*. For example, as shown in FIG. 1B, in some implementations, display device(s) may take the form of a projection device or system, such as a spinning point-of-view (POV) projected illumination "spinning scan line," a fisheye lens projector, or as multiple stitched projection-mapped video projectors, to name a few examples.

Alternatively, or in addition, in some implementations display device(s) may include one or more structures or panels having display elements embedded therein, such as a digital billboard or an LED or OLED wall or panel, for example. In each of the above described implementations, LBC server 142a or 142b may control display device(s) 146 using LBC effects 120a to render LBC effects 120a in LBC interaction zone 125.

Figure 2:
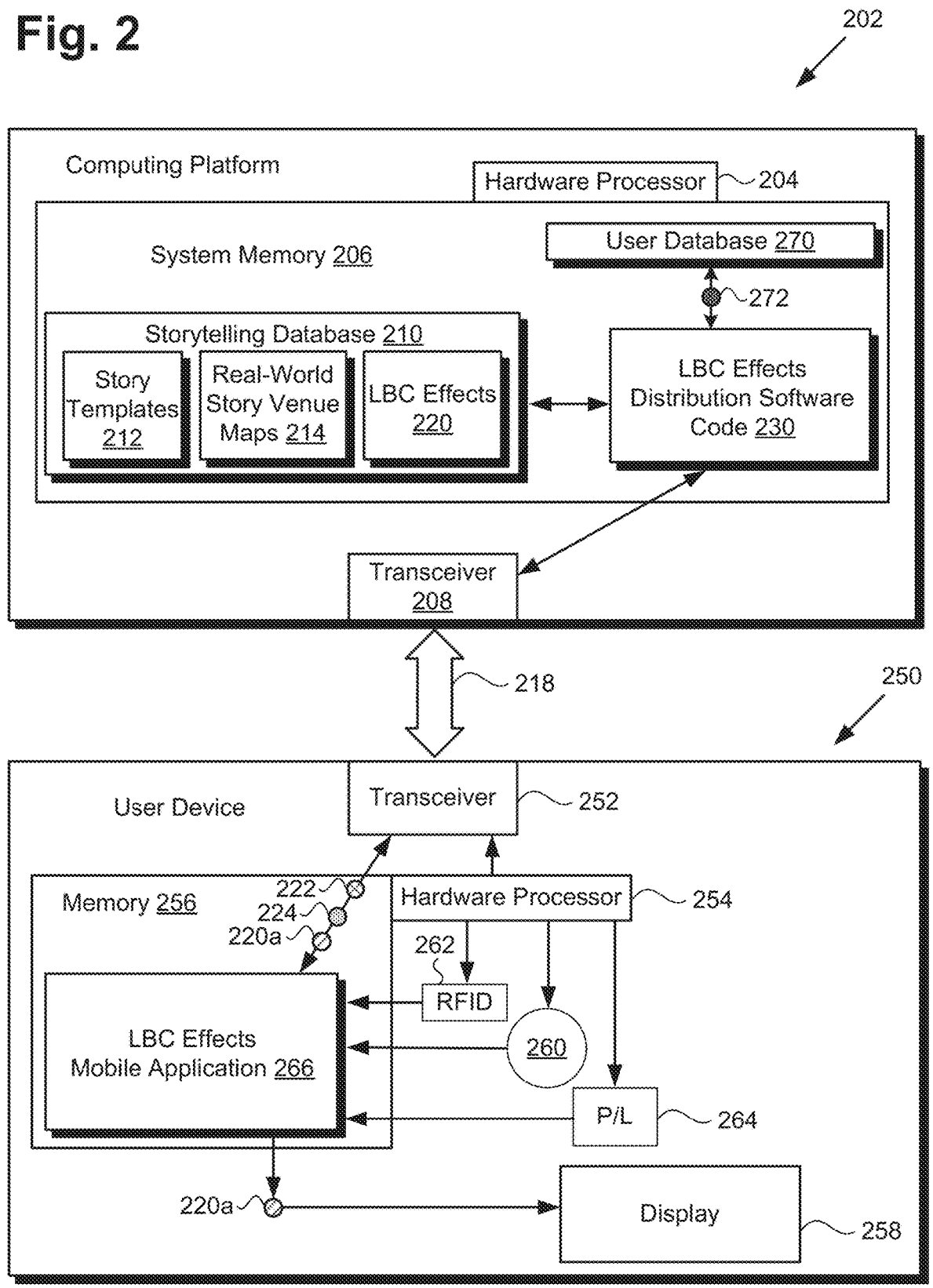
FIG. 2 shows a diagram including a more detailed exemplary representation of a user device in communication with a computing platform of the systems shown in FIGS. 1A and 1B, according to one implementation.

FIG. 2 shows a more detailed representation of exemplary user device 250 in combination with computing platform 202, according to one implementation. As shown in FIG. 2, user device 250 is communicatively coupled to computing platform 202 by network communication link 218. Computing platform 202 includes hardware processor 204, system memory 206 implemented as a non-transitory storage device, and transceiver 208. According to the exemplary implementation depicted in FIG. 2, system memory 206 stores LBC effects distribution software code 230, storytelling database 210, and user database 270 providing user model 272. Moreover, as shown in FIG. 2, storytelling database 210 includes story templates 212, real-world story venue maps 214, and LBC effects 220.

User device 250 includes hardware processor 254 and memory 256 implemented as a non-transitory storage device storing LBC effects mobile application 266. As also shown in FIG. 2, user device 250 may include any or all of transceiver 252, one or more cameras 260 (hereinafter "camera(s) 260"), radio-frequency identification (RFID) reader 262, one or more position/location sensors 264 (hereinafter "P/L sensor(s) 264"), and display 258 receiving LBC effects 220a from LBC effects mobile application 266. Also shown in FIG. 2 are story selection data 222 and location data 224 generated by user device 250 and received by computing platform 202 via network communication link 218.

Computing platform 202 having transceiver 208, hardware processor 204, and system memory 206 including user database 270 and storytelling database 210 storing story templates 212, real-world story venue maps 214, and LBC effects 220, corresponds in general to computing platform 102 having transceiver 108, hardware processor 104, and system memory 106 including user database 170 and storytelling database 110 storing story templates 112, real-world story venue maps 114, and LBC effects 120, in FIGS. 1A and 1B. Thus, computing platform 202, transceiver 208, hardware processor 204, system memory 206, user database 270 and storytelling database 210 may share any of the characteristics attributed to respective computing platform 102, transceiver 108, hardware processor 104, system memory 106, user database 170 and storytelling database 110 by the present disclosure, and vice versa.

In addition, LBC effects distribution software code 230 and user model 272 correspond respectively in general to LBC effects distribution software code 130 and user model 172, in FIGS. 1A and 1B. Consequently, LBC effects distribution software code 130 and user model 172 may share any of the characteristics attributed to respective LBC effects distribution software code 230 and user model 272 by the present disclosure, and vice versa. It is also noted that story selection data 222, location data 224, LBC effects 220a, and network communication link 218, in FIG. 2, correspond respectively in general to story selection data 122, location data 124, LBC effects 120a, and network communication links 118, in FIGS. 1A and 1B, and those corresponding features may share any of the characteristics attributed to either corresponding feature herein.

User device 250 corresponds in general to either or both of user devices 150a and 150b, in FIGS. 1A and 1B, and those corresponding features may share any of the characteristics attributed to either corresponding feature by the present disclosure. Thus, like user device 250, user devices 150a and 150b may include features corresponding to hardware processor 254, transceiver 252, camera(s) 260, RFID reader 262, P/L sensor(s) 264, and memory 256 storing LBC effects mobile application 266. In addition, display 258 of user device 250 corresponds in general to either or both of displays 158a and 158b of respective user devices 150a and 150b. That is to say, like displays 158a and 158b, display 258 may take the form of an LCD, an LED display, an OLED display, a QD display, or any other suitable display screen that performs a physical transformation of signals to light.

Transceiver 108/208 and transceiver 252 may be implemented as wireless communication hardware and software enabling computing platform 102/202 of storytelling system 100A/100B to exchange data with user devices 150a/250 and 150b/250 via network communication link 118/218. For example, transceiver 108/208 and transceiver 252 may be implemented as fourth generation of broadband cellular technology (4G) wireless transceivers, or as 5G wireless transceivers configured to satisfy the IMT-2020 requirements established by the International Telecommunication Union (ITU). Alternatively, or in addition, transceiver 108/208 and transceiver 252 may be configured to communicate via one or more of WiFi, Bluetooth, ZigBee, and 60 GHz wireless communications methods.

Camera(s) 260 may include one or more red-green-blue (RGB) still image cameras, video cameras, or a combination of RGB still image and video cameras. In addition, in some implementations those RGB cameras may include a depth sensor, i.e., they may be RGB-D still image or video cameras. Moreover, in some implementations, camera(s) 260 may correspond to an array of RGB or RGB-D still image or video cameras configured to generate a panoramic image of real-world story venue 140. P/L sensor(s) 264 may include one or more of accelerometers, gyroscopes, a GPS receiver, and a magnetometer, for example. In some implementations, P/L sensor(s) 264 may be implemented as an inertial measurement unit (IMU), as known in the art.

With respect to LBC effects mobile application 266, it is noted that in some implementations, LBC effects mobile application 266 may be a thin client application of LBC effects distribution software code 130/230. In those implementations, LBC effects mobile application 266 may enable user devices 150a/250 and 150b/250 to provide story selection data 122/222 and location data 124/224 to computing platform 102/202 for processing, and to receive LBC effects 120a/220a for rendering on display 158a/258 158b/258. According to the exemplary implementation shown in FIG. 2, LBC effects mobile application 266 is located in memory 256 of user devices 150a/250 and 150b/250, subsequent to transfer of LBC effects mobile application 266 to user devices 150a/250 and 150b/250 over a packet-switched network, such as the Internet, for example. Once present on user device 150a/250 and 150b/250, LBC effects mobile application 266 may be persistently stored in memory 256 and may be executed locally on user device 150a/250 and 150b/250 by hardware processor 254.

Figure 3:
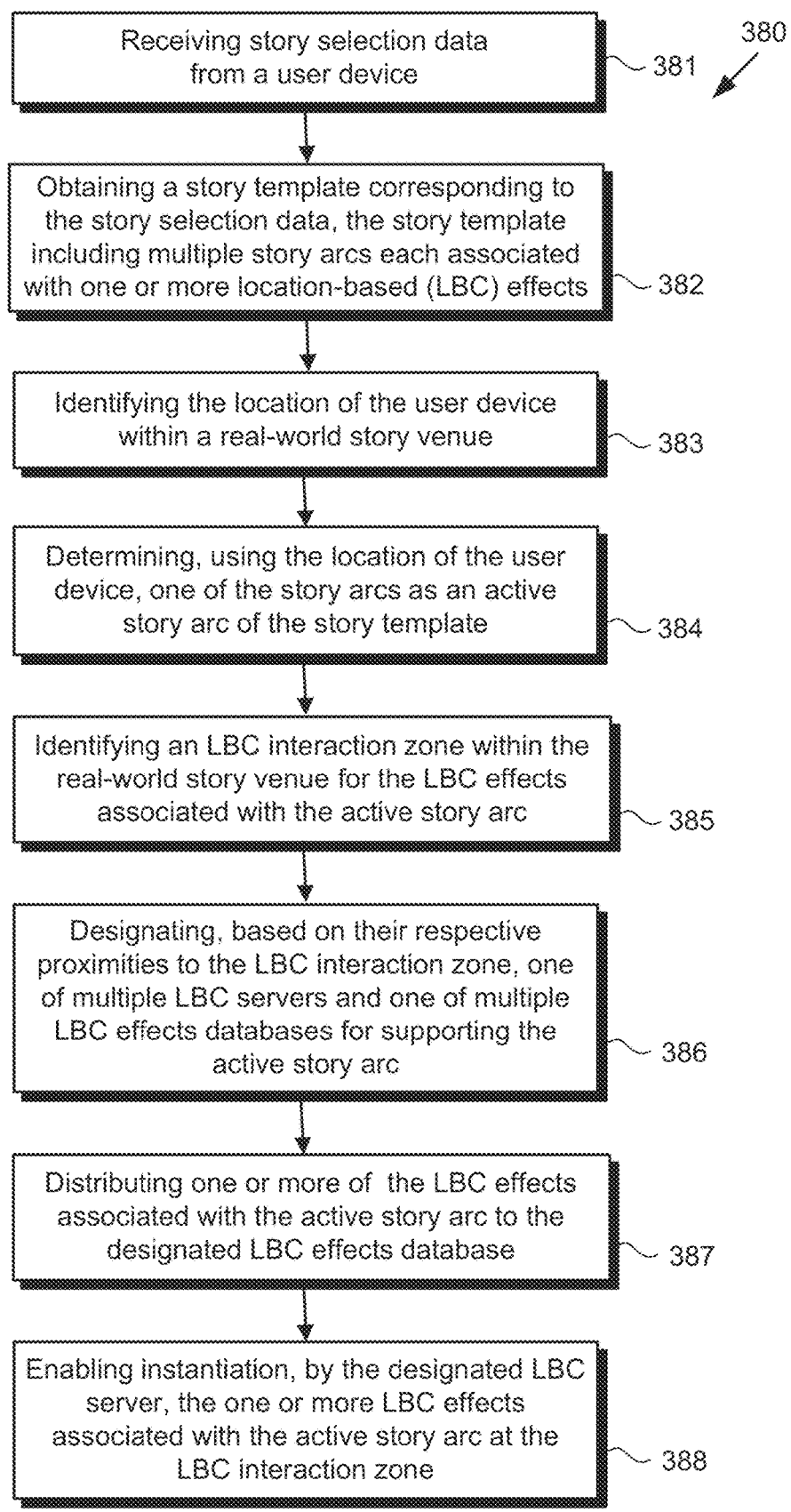
FIG. 3 is a flowchart presenting an exemplary method for performing location-based interactive storytelling, according to one implementation.

The functionality of storytelling systems 100A and 100B will be further described by reference to FIGS. 3 and 4 in combination with FIGS. 1A, 1B, and 2. FIG. 3 shows flowchart 380 presenting an exemplary method for performing location-based interactive storytelling, according to one implementation. With respect to the method outlined in FIG. 3, it is noted that certain details and features have been left out of flowchart 380 in order not to obscure the discussion of the inventive features in the present application.

Figure 4:
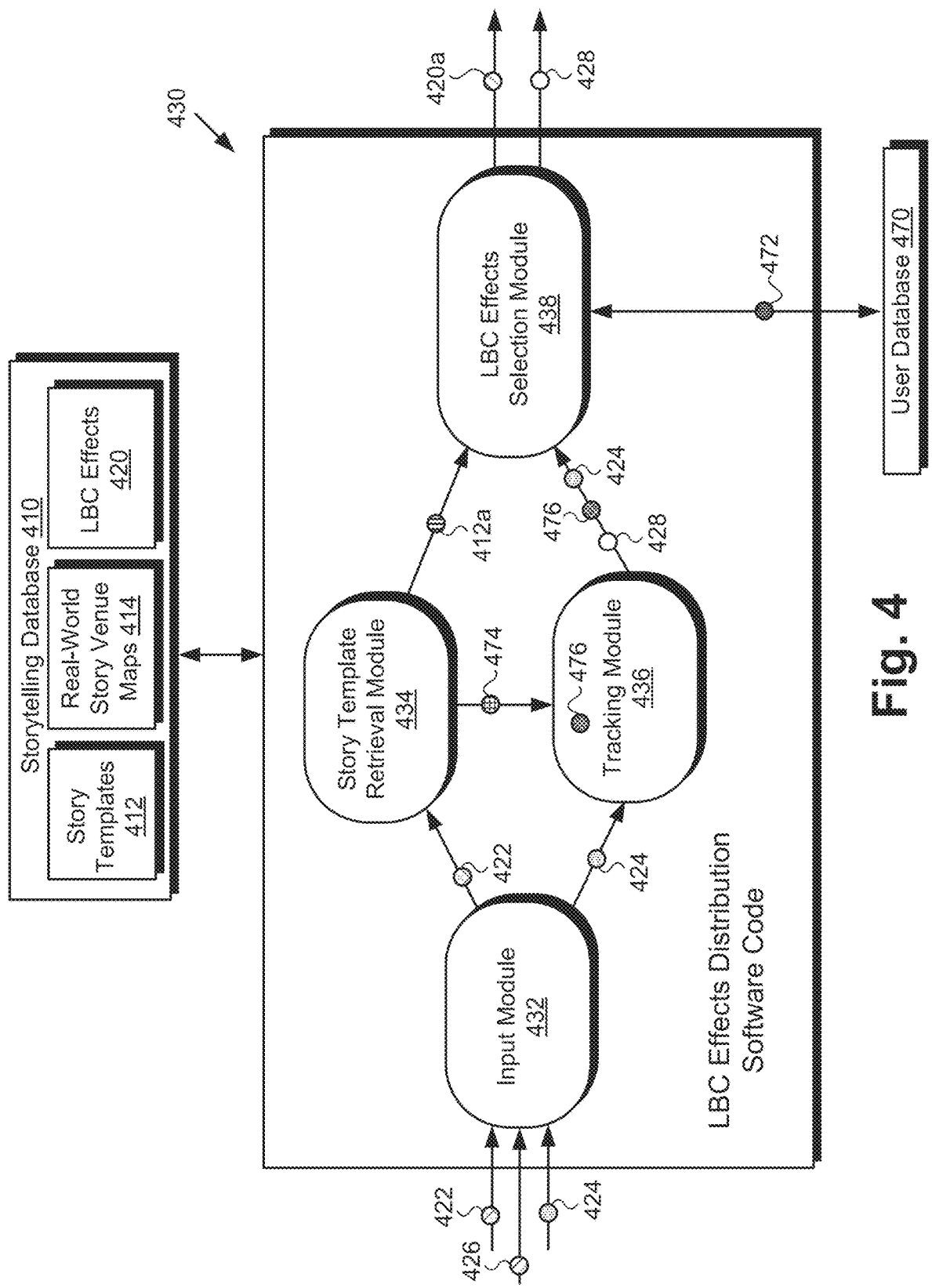
FIG. 4 shows an exemplary diagram of an LBC effects distribution software code suitable for execution by a hardware processor to perform location-based interactive storytelling, according to one implementation.

FIG. 4 shows an exemplary diagram of LBC effects distribution software code 430 suitable for execution by hardware processor 104/204, in FIGS. 1A, 1B, and 2, to perform location-based interactive storytelling, according to one implementation. As shown in FIG. 4, LBC effects distribution software code 430 may include input module 432, story template retrieval module 434, tracking module 436, and LBC effects selection module 438. In addition, FIG. 4 shows story selection data 422, location data 424, input 426, story template 412a, venue map identification data 474, real-world story venue map 476 corresponding to venue map identification data 474, viewing perspective data 428, and LBC effects 420a. Also shown in FIG. 4 are user database 470 providing user model 472, and storytelling database 410 storing story templates 412, real-world story venue maps 414, and LBC effects 420.

Selection data 422, location data 424, and LBC effects 420a correspond respectively in general to selection data 122/222, location data 124/224, and LBC effects 120a/220a, in FIGS. 1A, 1B, and 2, and those corresponding features may share any of the characteristics attributed to either feature by the present disclosure. Moreover, LBC effects distribution software code 430 corresponds in general to LBC effects distribution software code 130/230, in FIGS. 1A, 1B, and 2. That is to say, like LBC effects distribution software code 430, LBC effects distribution software code 130/230 may include modules corresponding respectively to input module 432, story template retrieval module 434, tracking module 436, and LBC effects selection module 438.

In addition, user database 470 providing user model 472, and storytelling database 410 storing story templates 412, real-world story venue maps 414, and LBC effects 420, in FIG. 4, correspond respectively in general to user database 170/270 providing user model 172/272, and storytelling database 110/210 storing story templates 112/212, real-world story venue maps 114/214, and LBC effects 120/220, in FIGS. 1A, 1B, and 2. Consequently, user database 470, user model 472, storytelling database 410, story templates 412, real-world story venue maps 414, and LBC effects 420 may share any of the characteristics attributed to respective user database 170/270, user model 172/272, storytelling database 110/210, story templates 112/212, real-world story venue maps 114/214, and LBC effects 120/220, by the present disclosure, and vice versa. It is noted that input 426 and viewing perspective data 428, in FIG. 4, correspond respectively in general to input 126 and viewing perspective data 128, in FIGS. 1A and 1B.

Referring to FIG. 3 in combination with FIGS. 1A, 1B, 2, and 4, flowchart 380 begins with receiving story selection data 122/222/422 from one or more of user devices 150a/250 and 150b/250 (action 381). Story selection data 122/222/422 is data identifying a location-based story with which one or more of user 148a of user device 150a/250 and user 148b of user device 150b/250 wants to interact. Story selection data 122/222/422 may be generated by LBC effects mobile application 266 in response to an input to one or more of user devices 150a/250 and 150b/250, such as a touchscreen tap or other input, or a voice command, for example, by one or more of users 148a and 148b. Story selection data 122/222/422 may be received via network 116 and network communication links 118/218 by LBC effects distribution software code 130/230/430 of computing platform 102/202, executed by hardware processor 104/204, and using input module 432.

Flowchart 380 continues with obtaining story template 412a corresponding to story selection data 122/222/422, where story template 412a includes multiple story arcs each associated with at least one of LBC effects 120/220/420 (action 382). In some implementations, story template 412a, as well as other story templates 112/212/412 for use in authoring location-based interactive stories may be stored in storytelling database 110/210/410.

As noted above, story template 412a may include multiple, possibly parallel, story arcs that are translated into 3D animations or trigger instantiation of other LBC effects at runtime. The story being authored based on story template 412a may branch into one of several continuation story arcs based on the actions by one or more of users 148a and 148b, or interactions by the user or users with a present story arc. It is noted that a story arc may also be interrupted based on user interaction. Moreover, a user can transition to a different story arc at any time, given that the present state of the story template allows it. As also noted above, restrictions imposed on transitions between story arcs are to ensure continuity of the user interaction experience when transitioning amongst story arcs.

In addition, story template 412a may also identify one of real-world story venue maps 114/214/414 corresponding to story template 412a. Real-world story venue maps 114/214/414 stored in storytelling database 110/210/410 may uniquely map the locations of each interaction zone 125 within real-world story venue 140 for each different story supported by story templates 112/212/412. That is to say, story template 412a may identify one of real-world story venue maps 114/214/414 uniquely associated with story template 412a. Story template 412a corresponding to story selection data 122/222/422 may be obtained from among story templates 112/212/412 stored in storytelling database 110/210/410 by LBC effects distribution software code 130/230/430, executed by hardware processor 104 of computing platform 102, and using story template retrieval module 434.

Flowchart 380 continues with identifying a location of one or more of user devices 150a/250 and 150b/250 within real-world story venue 140 (action 383). As noted above, user devices 150a/250 and 150b/250 may include RFID reader 262 or P/L sensor(s) 264, and may be configured to report their presence in real-world story venue 140 to computing platform 102/202. In those implementations, computing platform 102/202 may receive location data 124/224/424 from one or more of user devices 150a/250 and 150b/250. In some implementations, location data 124/224/424 may be received via network 116 and network communication links 118/218 by LBC effects distribution software code 130/230/430 of computing platform 102/202, executed by hardware processor 104/204. LBC effects distribution software code 130/230/430 may then utilize tracking module 436 to obtain real-world story venue map 476 identified by venue map identification data 474, and identify the location of one or more of user devices 150a/250 and 150b/250 within real-world story venue 140 using that real-world venue map and location data 124/224/424.

Alternatively, or in addition and as also discussed above, in some implementations, storytelling system 100A/100B may be configured to identify the location and orientation of one or more of user devices 150*a*/250 and 150*b*/250 in real-world story venue 140 independently of location data 124/224/424. For example, in some implementations, storytelling system 100A/100B may include one or more tracking devices in the form of a camera, camera array, or one or more other type of optical sensor for determining the location and orientation of one or more of user devices 150*a*/250 and 150*b*/250 in real-world story venue 140. Such tracking devices may also include multiple components distributed within real-world story venue 140 and configured to perform radio-signal triangulation to determine the location and orientation of one or more of user devices 150*a*/250 and 150*b*/250. As yet another alternative, or additionally, storytelling system 100A/100B may be configured to perform SLAM to determine the location and orientation of one or more of user devices 150*a*/250 and 150*b*/250 in real-world story venue 140. Action 383 may be performed by LBC effects distribution software code 130/230/430 of computing platform 102/202, executed by hardware processor 104/204, and using tracking module 436. LBC effects distribution software code 130/230/430 may also utilize tracking module 436 to obtain real-world story venue map 476 identified by venue map identification data 474, and identify the location of one or more of user devices 150*a*/250 and 150*b*/250 within real-world story venue 140 using that real-world venue map.

Flowchart 380 continues with determining, using the location of one or more of user devices 150*a*/250 and 150*b*/250 within real-world story venue 140, one of the multiple story arcs of story template 412*a* as an active story arc of story template 412*a* (action 384). The story being authored based on story template 412*a* may branch into one of several story arcs based on the location of one or more users 148*a* and 148*b* and respective one or more user devices 150*a*/250 and 150*b*/250 within real-world story venue 140. In action 384, story template 412*a*, real-world story venue map 476, and the location of one or more user devices 150*a*/250 and 150*b*/250 can be used determine which of the multiple story arcs included in story template 412*a* one or more users 148*a* and 148*b* is/are interacting with to begin or continue his/her/their progression through story template 412*a*. Action 384 may be performed by LBC effects distribution software code 130/230/430 of computing platform 102/202, executed by hardware processor 104/204, and using LBC effects selection module 438.

Flowchart 380 continues with identifying LBC interaction zone 125 within the real-world story venue 140 for LBC effects 120*a*/220*a*/420*a* associated with the active story arc (action 385). LBC effects 120*a*/220*a*/420*a* is/are that subset of LBC effects 120/220/420 associated with the particular story arc included in story template 412*a* that has been determined to be the active story template in action 384. As noted above, storytelling system 100A/100B enables visualization, either on one or more of user devices 150*a*/250 and 150*b*/250, or through use of display device 146, of a 3D story corresponding to story selection data 122/222/422 and acted out on virtual stages provided by LBC interaction zones 125 that are anchored in the physical environment, for example using augmented reality (AR) techniques. Each LBC interaction zone 125 is anchored at a specific location within real-world story venue 140, via one or more localization technologies such as GPS, AR markers, and Ground Plane detection, and other techniques for anchoring virtual content in the physical environment.

It is noted that although LBC interaction zone 125 may correspond to a variety of different LBC effects 120*a*/220*a*/420*a*, it is contemplated that knowledge of the progressive locations of one or more of user devices 150*a*/250 and 150*b*/250, i.e., its/their progressive movement within real-world story venue 140, coupled with the active story arc of story template 412*a* determined in action 384 provides sufficient data to identify LBC interaction zone 125 for LBC effects 120*a*/220*a*/420*a* before arrival of one or more of users 148*a* and 148*b* and respective user devices 150*a*/250 and 150*b*/250 at LBC interaction zone 125. Action 385 may be performed by LBC effects distribution software code 130/230/430 of computing platform 102/202, executed by hardware processor 104/204, and using LBC effects selection module 438, story template 412*a*, location data 124/224/424, and real-world story venue map 476.

Flowchart 380 continues with designating, based on their respective proximities to LBC interaction zone 125, one of LBC servers 142*a* and 142*b*, and one of LBC effects databases 144*a* and 144*b* for supporting the active story arc (action 386). The purpose of action 386 is to identify the combination of an LBC server and an LBC effects database that will minimize the latency associated with instantiation of LBC effects 120*a*/220*a*/420*a* in LBC interaction zone 125. That is to say, action 386 may include identifying the one of LBC servers 142*a* or 142*b*, and the one of LBC effect databases 144*a* or 144*b* that are located closest to LBC interaction zone 125. Action 386 may be performed by LBC effects distribution software code 130/230/430 of computing platform 102/202, executed by hardware processor 104/204, and using LBC effects selection module 438, story template 412*a*, location data 124/224/424, and real-world story venue map 476.

Flowchart 380 continues with distributing one or more of LBC effects 120*a*/220*a*/420*a* associated with the active story arc to the one of LBC effects databases 144*a* and 144*b* designated in action 386 (action 387). Action 387 serves to locally cache LBC effects(s) 120*a*/220*a*/420*a* needed to support the active story arc of story template 412*a* at LBC interaction zone 125. That local caching of LBC effects 120*a*, in turn, enables instantiation of LBC effects 120*a*/220*a*/420*a* "just-in-time" as one or more of users 148*a* and 148*b* arrive at LBC interaction zone 125. As noted above, LBC effects 120*a*/220*a*/420*a* may include one or more smart effects, such as 2D or 3D interactive characters, which may be life-size, and may be walking or otherwise ambulatory, as well as 2D or 3D interactive smart objects. In addition, LBC effects 120*a*/220*a*/420*a* may include 2D or 3D images of props, such as historical or modern clothing or other attire, weaponry, vehicles, and structures, for example, other images, video content, audio content, and text. Action 387 may be performed by LBC effects distribution software code 130/230/430 of computing platform 102/202, executed by hardware processor 104/204, and using LBC effects selection module 438, story template 412*a*, location data 124/224/424, and real-world story venue map 476.

In some implementations, storytelling system 100A/100B may include user database 170/270/470 accessible by computing platform 102/202, user database 170/270/470 storing user model 172/272/472 associated with one of user devices 150*a*/250 and 150*b*/250. In those implementations, action 387 may be selecting, by LBC effects selection module 438 of LBC effects distribution software code 130/230/430, executed by hardware processor 104/204, and using at least one of a known user preference or an inferred user preference included in user model 172/272/472, the one or more of LBC effects 120*a*/220*a*/420*a* associated with the active story arc for distribution to the one of LBC effects databases 144*a* and 144*b* designated in action 386.

Flowchart 380 continues with enabling instantiation, by the one of LBC servers 142a and 142b designated in action 386, of one or more of LBC effects 120a/220a/420a associated with the active story arc of story template 412a when one or more of user devices 150a/250 and 150b/250 arrive at LBC interaction zone 125 (action 388). In some implementations, as shown in FIG. 1A, enabling instantiation of LBC effects 120a/220a/420a associated with the active story arc includes delivering one or more of LBC effects 120a/220a/420a to one or more of user devices 150a/250 and 150b/250 for display by user devices 150a/250 and 150b/250. For example, one or more of LBC effects 120a/220a/420a may be downloaded to one or both of user devices 150a/250 and 150b/250 for rendering by user devices 150a/250 and 150b/250 on respective displays 158a/258 and 158b/258.

However, in use cases in which user devices 150a/250 or 150b/250 lack the computational power to perform low latency rendering of rich 3D LBC effects, the one of LBC servers 142a and 142b designated in action 386 may enable instantiation of one or more of LBC effects 120a/220a/420a by rendering one or more of LBC effects 120a/220a/420a on the LBC server, and deliver only the 3D overlay to user device 150a/250 or 150b/250 frame-by-frame. The LBC server may perform the render and frame-by-frame 3D overlay delivery based on the intrinsic parameters of the virtual cameras of respective user devices 150a/250 and 150b/250, as well as the state of the story for users 148a and 148b. As a result, even users with less powerful user devices can advantageously experience and enjoy high-end graphics. It is noted that, whether one or more of LBC effects 120a/220a/420a are downloaded to user devices 150a/250 and 150b/250, or rendered by the LBC server and delivered as a 3D overlay frame-by-fame, in use cases in which multiple user devices 150a/250 and 150b/250 utilized by respective users 148a and 148b are engaging with LBC interaction zone 125 at the same time, instantiation of the one or more of LBC effects 120a/220a/420a in action 388 may be performed for each of user devices 150a/250 and 150b/250 concurrently.

Referring to FIG. 1B, in some implementations storytelling system 100B may include display device(s) 146 controlled by the one of the LBC servers designated in action 386, e.g., LBC server 142a. In some of those implementations, enabling instantiation of one or more of LBC effects 120a/220a/420a associated with the active story arc of story template 412a includes rendering, by LBC server 142a using display device(s) 146, the one or more of LBC effects 120a/220a/420a in LBC interaction zone 125.

In some implementations, storytelling system may be configured to determine the viewing perspective or perspectives of each of one or more users 148a and 148b of one or more respective user devices 150a/250 and 150b/250. In those implementations, action 388 may include enabling instantiation, by the one LBC server designated in action 386, of one or more of LBC effects 120a/220a/420a associated with the active story arc of story template 412a from the determined perspective or perspectives of one or more users 148a and 148b, based on viewing perspective data 128/428. Determining the viewing perspective of any of users 148a and 148b may include approximating the viewing distortion experienced by 148a and 148b relative to the location and orientation of respective user devices 150a/250 and 150b/250 during use. In some implementations, as discussed above, storytelling system 100A/100B may be configured to perform eye tracking or skeleton tracking of one or more users 148a and 148b in real-world story venue 140. Alternatively, or in addition, optical tracking data obtained by storytelling system 100A/100B may enable LBC effects distribution software code 130/230/430, executed by hardware processor 104/204 of computing platform 102/202, to estimate the viewing perspective of users 148a and 148b based on the distance separating the eyes of each of users 148a and 148b from respective user devices 150a/250 and 150b/250, or based on the head position of users 148a and 148b.

Moreover, in some implementations, hardware processor 104/204 may be further configured to execute LBC effects distribution software code 130/230/430 to trigger instantiation of another one or more LBC effects based on an interaction by one or more of users 148a or 148b of respective user devices 150a/250 and 150b/250. For example, hardware processor 104 may execute LBC effects distribution software code 130/230/430 to trigger instantiation of another one or more LBC effects in response to one or more of an interaction by user 148a with user of 148b, or an interaction by either or both of users 148a and 148b with real-world story venue 140.

Figure 5A:
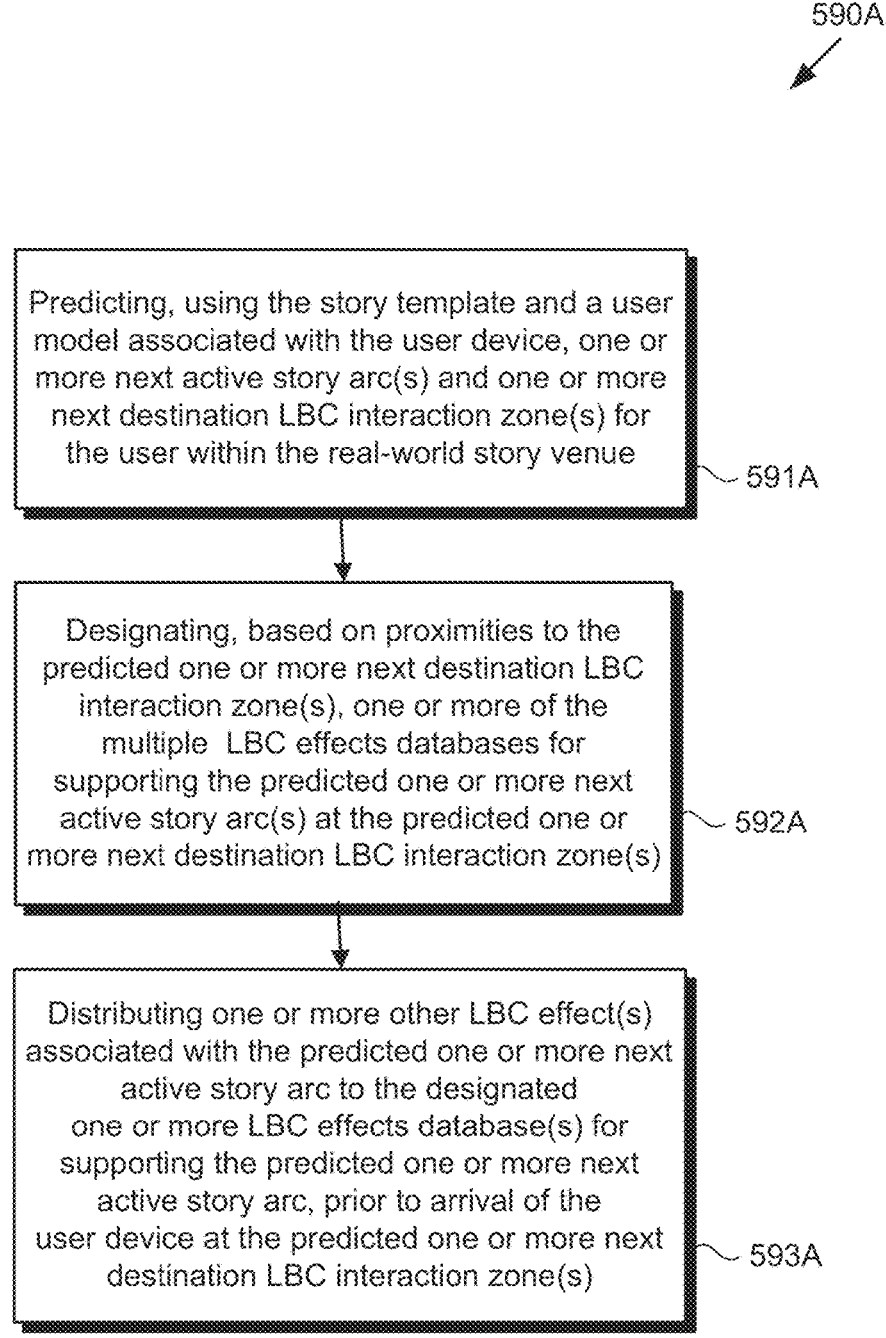
FIG. 5A is a flowchart presenting exemplary steps for extending the method presented in FIG. 3, according to one implementation.

FIG. 5A is flowchart 590A presenting exemplary steps for extending the method presented in FIG. 3, according to one implementation. With respect to the actions described in FIG. 5A, it is noted that certain details and features have been left out of flowchart 590A in order not to obscure the discussion of the inventive features in the present application.

Referring to FIG. 5A in combination with FIGS. 1A, 1B, 2, and 4, flowchart 590A begins with predicting, using story template 412a and user model 172/272/472 one or more next active story arc(s) and one or more next destination LBC interaction zone(s) for one of users 148a or 148b within real-world story venue 140 (action 591A). Action 591A may be performed by LBC effects distribution software code 130/230/430 of computing platform 102/202, executed by hardware processor 104/204, and using tracking module 436, story template 412a, user model 172/272/472, location data 124/224/424, and real-world story venue map 476.

Flowchart 590A continues with designating, based on their proximities to the predicted one or more next destination LBC interaction zone(s), one or more of LBC effects databases 144a and 144b for supporting the one or more next active story arc(s) at the one or more next destination LBC interaction zone(s) predicted in action 591A (action 592A). Action 592A may be performed by LBC effects distribution software code 130/230/430 of computing platform 102/202, executed by hardware processor 104/204, and using LBC effects selection module 438, story template 412a, input 126/426, location data 124/224/424, and real-world story venue map 476, in a manner analogous to that described above by reference to action 386 in FIG. 3.

Flowchart 590A continues and concludes with distributing one or more other of LBC effects 120a/220a/420a for supporting the one or more next active story arc(s) predicted in action 591A to the one or more of LBC effects databases 144a and 144b designated in action 592A, prior to the arrival of the user devices utilized by user 148a or user 148b at the predicted one or more next destination LBC interaction zone(s) (action 593A). Action 593A may be performed by LBC effects distribution software code 130/230/430 of computing platform 102/202, executed by hardware processor 104/204, and using LBC effects selection module 438, story template 412a, input 126/426, location data 124/224/424, and real-world story venue map 476, in a manner analogous to that described above by reference to action 387 in FIG. 3.

Figure 5B:
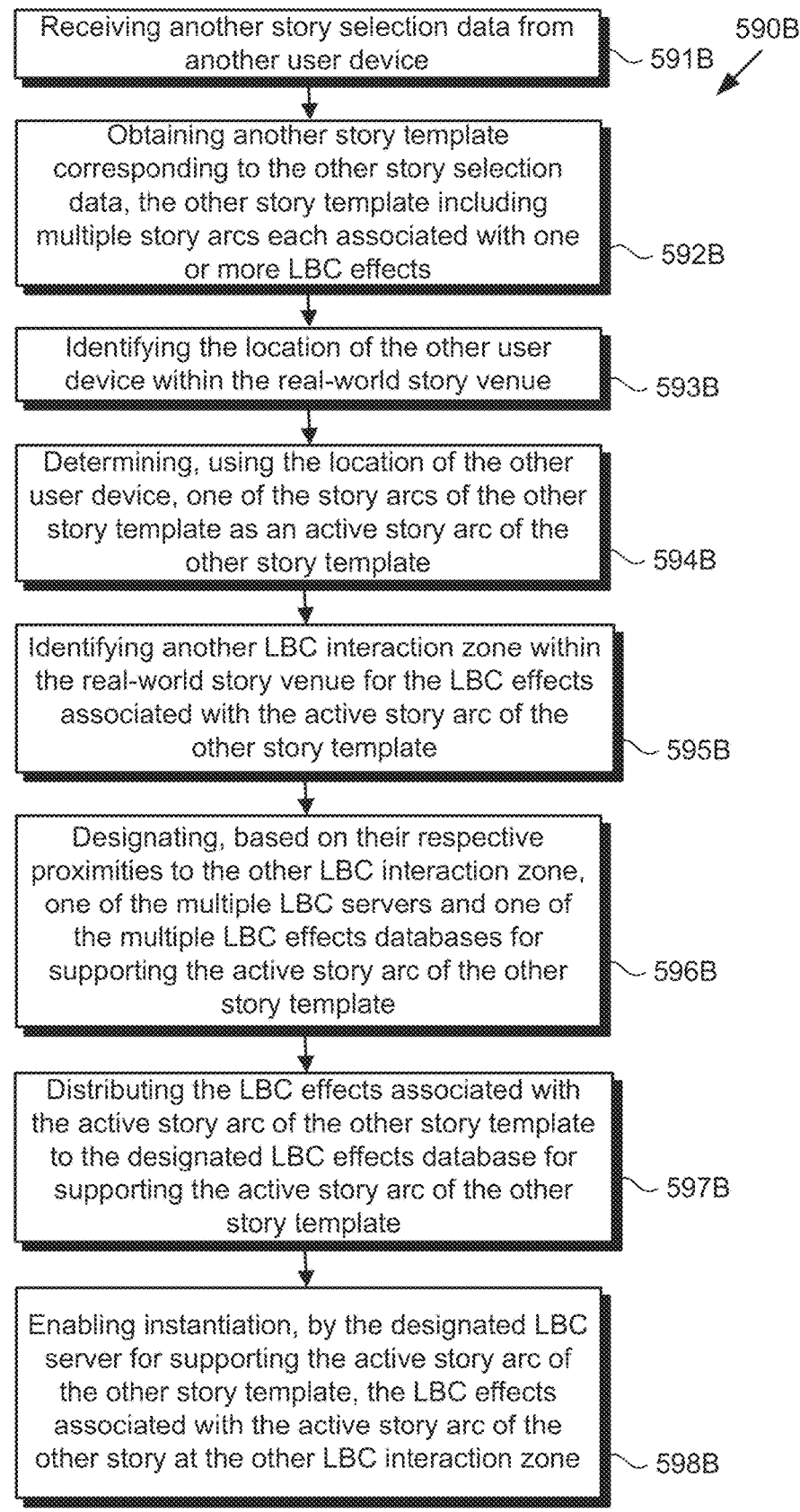
FIG. 5B is a flowchart presenting exemplary steps for extending the method presented in FIG. 3, according to another implementation.

Referring now to FIG. 5B, FIG. 5B is flowchart 590B presenting exemplary steps for extending the method presented in FIG. 3, according to another implementation. It is noted that, in some implementations, the actions described by flowchart 590B may follow the actions described by flowchart 380, in FIG. 3, and may be performed in lieu of, or in parallel with, the actions described by flowchart 590A. However, in other implementations, the actions described by flowchart 590B may be performed in parallel with the actions described by flowchart 380. With respect to the actions described in FIG. 5B, it is noted that certain details and features have been left out of flowchart 590B in order not to obscure the discussion of the inventive features in the present application.

Referring to FIG. 5B in combination with FIGS. 1A, 1B, 2, and 4, flowchart 590B begins with receiving another story selection data 122/222/422 from another of one or more user devices 150a/250 and 150b/250 (action 591B). Story selection data 122/222/422 is data identifying a location-based story with which another one of user 148a or 148b of respective user devices 150a/250 or 150b/250 wants to interact. Story selection data 122/222/422 may be generated by LBC effects mobile application 266 in response to an input to one or more of user devices 150a/250 and 150b/250, such as a touchscreen tap or other input, or a voice command, for example, by one or more of users 148a and 148b. Story selection data 122/222/422 may be received in action 591B via network 116 and network communication links 118/218 by LBC effects distribution software code 130/230/430 of computing platform 102/202, executed by hardware processor 104/204, and using input module 432.

Flowchart 590B continues with obtaining another story template corresponding to the other story selection data received in action 591B, the other story template including multiple story arcs each associated with one or more LBC effects 120/220/420 (action 592B). Action 592B may be performed by LBC effects distribution software code 130/230/430, executed by hardware processor 104 of computing platform 102, and using story template retrieval module 434, in a manner analogous to that described above by reference to action 382 in FIG. 3.

Flowchart 590B continues with identifying the location of the other of user devices 150a/250 or 150b/250 from which the other story selection data was received in action 591B, within real-world story venue 140 (action 593B). Action 593B may be performed by LBC effects distribution software code 130/230/430, executed by hardware processor 104 of computing platform 102, and using tracking module 436, in a manner analogous to that described above by reference to action 383 in FIG. 3.

Flowchart 590B continues with determining, using the location of the other of user devices 150a/250 or 150b/250 identified in action 593B, one of the story arcs of the other story template as an active story arc of the other story template (action 594B). Action 594B may be performed by LBC effects distribution software code 130/230/430, executed by hardware processor 104 of computing platform 102, and using LBC effects selection module 438, in a manner analogous to that described above by reference to action 384 in FIG. 3.

Flowchart 590B continues with identifying another LBC interaction zone within real-world story venue 140 for LBC effects 120a/220a/420a associated with the active story arc determined in action 594B (action 595B). Action 595B may be performed by LBC effects distribution software code 130/230/430 of computing platform 102/202, executed by hardware processor 104/204, and using LBC effects selection module 438, the other story template obtained in action 592B, location data 124/224/424, and real-world story venue map 476, in a manner analogous to that described above by reference to action 385 in FIG. 3.

Flowchart 590B continues with designating, based on their proximities to the LBC interaction zone for LBC effects 120a/220a/420a associated with the active story arc determined in action 594B, one of LBC servers 142a and 142b and one of effects databases 144a and 144b for supporting that active story arc (action 596B). Action 596B may be performed by LBC effects distribution software code 130/230/430 of computing platform 102/202, executed by hardware processor 104/204, and using LBC effects selection module 438, the other story template obtained in action 592B, location data 124/224/424, and real-world story venue map 476, in a manner analogous to that described above by reference to action 386 in FIG. 3.

Flowchart 590B continues with distributing LBC effects 120a/220a/420a associated with the active story arc determined in action 594B to the one of LBC effects databases 144a and 144b designated in action 596A for supporting that active story arc (action 597B). Action 597B may be performed by LBC effects distribution software code 130/230/430 of computing platform 102/202, executed by hardware processor 104/204, and using LBC effects selection module 438, the other story template obtained in action 592B, location data 124/224/424, and real-world story venue map 476, in a manner analogous to that described above by reference to action 387 in FIG. 3.

Flowchart 590B may continue and conclude with enabling instantiation, by the one of LBC servers 142a and 142b designated in action 596B, of LBC effects 120a/220a/420a associated with the active story arc determined in action 594B when the other of user devices 150a/250 or 150b/250 arrives at the LBC interaction zone for LBC effects 120a/220a/420a associated with the active story arc (action 598B). Action 598B may be performed by one of LBC servers 142a or 142b, in a manner analogous to that described above by reference to action 388 in FIG. 3.

It is emphasized that, in various implementations, actions 381-388, or actions 381-388 and 591A-593A, or actions 381-388 and 591B-598B, or actions 381-388, actions 591A-593A, and actions 591B-598B, may be performed in an automated process from which human involvement may be omitted.

Thus, the present application discloses location-based interactive storytelling systems and methods that overcome the drawbacks and deficiencies in the conventional art. As discussed above, the disclosed location-based storytelling system architecture makes it possible for a mobile client application to efficiently stream LBC effects only when required. A 3D story can be visualized on a mobile device and acted out in LBC interaction zones that are anchored at specific physical locations within a real-world story venue. The mobile client application communicates with a computing platform of the system to request a story template including multiple story arcs each associated with LBC effects. The mobile client can then acquire the LBC effects and other media associated with the story when contextually appropriate, for example, when the user is physically near an LBC interaction zone.

A story structure including four basic behaviors has been disclosed that authors and delivers a location-based interactive story that adapts to the user's location-based interactions with both the digital and physical world. As also discussed above, present location-based interactive storytelling solution is advantageously capable of delivering multiple stories, which do not need to be related to each other, substantially concurrently, such that each story can be considered a game or interactive experience onto itself. Moreover, the location-based interactive storytelling solution disclosed by the present application may advantageously be utilized in a wide variety of use cases including, but not limited to, AR games, interactive stories and plays, tourism, theme park experiences, urban navigational assistance, and immersive educational presentations.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A storytelling system comprising:
    a plurality of location-based content (LBC) servers and a plurality of LBC effects databases for use in a real-world story venue;
    a computing platform communicatively coupled to the plurality of LBC servers and the plurality of LBC effects databases, the computing platform having a hardware processor and a system memory storing a software code;
    the hardware processor configured to execute the software code to:
        receive a story selection data from a user device;
        obtain a story template corresponding to the story selection data, the story template including a plurality of story arcs each associated with at least one LBC effect;
        identify a location of the user device within the real-world story venue;
        determine, using the location of the user device, one of the plurality of story arcs as an active story arc of the story template;
        identify an LBC interaction zone within the real-world story venue for the at least one LBC effect associated with the active story arc;
        designate, based on respective proximities to the LBC interaction zone, one of the plurality of LBC servers and one of the plurality of LBC effects databases for supporting the active story arc; and
        distribute one or more of the at least one LBC effect associated with the active story arc to the designated one of the plurality of LBC effects databases;
    wherein the designated one of the plurality of LBC servers is configured to enable instantiation of the one or more of the at least one LBC effect associated with the active story arc at the LBC interaction zone.

2. The storytelling system of claim 1, wherein the designated one of the plurality of LBC servers is configured to enable instantiation of the one or more of the at least one LBC effect associated with the active story arc by delivering the one or more of the at least one LBC effect associated with the active story arc to the user device for display by the user device.

3. The storytelling system of claim 1, further comprising a display device controlled by the designated one of the plurality of LBC servers, and wherein the designated one of the plurality of LBC servers is configured to enable instantiation of the one or more of the at least one LBC effect associated with the active story arc by rendering, using the display device, the one or more of the at least one LBC effect associated with the active story arc in the LBC interaction zone.

4. The storytelling system of claim 1, wherein the one or more of the at least one LBC effect associated with the active story arc comprises an image of at least one of a smart effect or a multi-media effect.

5. The storytelling system of claim 1, wherein the hardware processor is further configured to execute the software code to determine a viewing perspective of a user of the user device; and
    wherein the designated one of the plurality of LBC servers is configured to enable instantiation of the one or more of the at least one LBC effect associated with the active story arc from the determined viewing perspective of the user.

6. The storytelling system of claim 1, wherein the user device is one of a plurality of user devices;
    wherein the hardware processor is further configured to execute the software code to determine a plurality of viewing perspectives corresponding respectively to each of a plurality of users of the plurality of user devices; and
    wherein the designated one of the plurality of LBC servers is configured to enable instantiation of the one or more of the at least one LBC effect associated with the active story arc from the determined plurality of viewing perspectives.

7. The storytelling system of claim 6, wherein the hardware processor is further configured to execute the software code to trigger instantiation of another LBC effect in response to at least one of an interaction by a user of one of the plurality of user devices with another user of another one of the plurality of user devices, an interaction by the user with an LBC effect presently instantiated at the LBC interaction zone, one or more interactions by the user with one or more LBC effects previously instantiated at one or more LBC interaction zones, or an interaction by the user with the real-world story venue.

8. The storytelling system of claim 1, further comprising a user database accessible by the computing platform, the user database storing a user model associated with a user of the user device, and wherein the hardware processor is further configured to execute the software code to:
    select, using at least one of a known user preference or an inferred user preference included in the user model associated with the user device, the one or more of the at least one LBC effect associated with the active story arc for distribution to the designated one of the plurality of LBC effects databases.

9. The storytelling system of claim 8, wherein the hardware processor is further configured to execute the software code to:
    predict, using the story template and the user model associated with the user of the user device, at least one next active story arc and at least one next destination LBC interaction zone for the user within the real-world story venue;
    designate, based on proximities to the predicted at least one next destination LBC interaction zone, at least one of the plurality of LBC effects databases for supporting the predicted at least one next active story arc at the predicted at least one next destination LBC interaction zone; and distribute at least one other LBC effect associated with the predicted at least one next active story arc to the designated at least one of the plurality of LBC effects databases for supporting the predicted at least one next active story arc prior to arrival of the user device at the predicted at least one next destination LBC interaction zone.

10. The storytelling system of claim 1, wherein the hardware processor is further configured to execute the software code to:

receive another story selection data from another user device;

obtain another story template corresponding to the another story selection data, the another story template including a plurality of story arcs each associated with at least one LBC effect;

identify a location of the another user device within the real-world story venue;

determine, using the location of the another user device, one of the plurality of story arcs of the another story template as an active story arc of the another story template;

identify another LBC interaction zone within the real-world story venue for the at least one LBC effect associated with the active story arc of the another story template;

designate, based on proximities to the another LBC interaction zone, one of the plurality of LBC servers and one of the plurality of LBC effects databases for supporting the active story arc of the another story template; and distribute the at least one LBC effect associated with the active story arc of the another story template to the designated one of the plurality of LBC effects databases for supporting the active story arc of the another story template;

wherein the designated one of the plurality of LBC servers for supporting the active story arc of the another story template is configured to enable instantiation of the at least one LBC effect associated with the active story arc of the another story template at the another LBC interaction zone.

11. A method for use by a storytelling system including a plurality of location-based content (LBC) servers and a plurality of LBC effects databases for use in a real-world story venue, and a computing platform communicatively coupled to the plurality of LBC servers and the plurality of LBC effects databases, the computing platform having a hardware processor and a system memory storing a software code, the method comprising:

receiving, by the software code executed by the hardware processor, a story selection data from a user device;

obtaining, by the software code executed by the hardware processor, a story template corresponding to the story selection data, the story template including a plurality of story arcs each associated with at least one LBC effect;

identifying, by the software code executed by the hardware processor, a location of the user device within the real-world story venue;

determining, by the software code executed by the hardware processor, using the location of the user device, one of the plurality of story arcs as an active story arc of the story template;

identifying, by the software code executed by the hardware processor, an LBC interaction zone within the real-world story venue for the at least one LBC effect associated with the active story arc;

designating, by the software code executed by the hardware processor, based on proximities to the LBC interaction zone, one of the plurality of LBC servers and one of the plurality of LBC effects databases for supporting the active story arc;

distributing, by the software code executed by the hardware processor, one or more of the at least one LBC effect associated with the active story arc to the designated one of the plurality of LBC effects databases; and enabling instantiation, by the designated one of the plurality of LBC servers, of the one or more of the at least one LBC effect associated with the active story arc at the LBC interaction zone.

12. The method of claim 11, wherein enabling instantiation of the one or more of the at least one LBC effect associated with the active story arc comprises delivering the one or more of the at least one LBC effect associated with the active story arc to the user device for display by the user device.

13. The method of claim 11, wherein the storytelling system further comprises a display device controlled by the designated one of the plurality of LBC servers, and wherein enabling instantiation of the one or more of the at least one LBC effect associated with the active story arc comprises rendering, using the display device, the one or more of the at least one LBC effect associated with the active story arc in the LBC interaction zone.

14. The method of claim 11, wherein one or more of the at least one LBC effect associated with the active story arc comprises an image of at least one of a smart effect or a multi-media effect.

15. The method of claim 11, further comprising:

determining, by the software code executed by the hardware processor, a viewing perspective of a user of the user device; and wherein enabling instantiation, by the designated one of the plurality of LBC servers, of the one or more of the at least one LBC effect associated with the active story arc comprises enabling instantiation of the one or more of the at least one LBC effect associated with the active story arc from the determined viewing perspective of the user.

16. The method of claim 11, wherein the user device is one of a plurality of user devices, the method further comprising:

determining, by the software code executed by the hardware processor, a plurality of viewing perspectives corresponding respectively to each of a plurality of users of the plurality of user devices; and wherein enabling instantiation, by the designated one of the plurality of LBC servers, of the one or more of the at least one LBC effect associated with the active story arc comprises enabling instantiation of the one or more of the at least one LBC effect associated with the active story arc from the determined plurality of viewing perspectives.

17. The method of claim 16, further comprising:

triggering, by the software code executed by the hardware processor, instantiation of another LBC effect in response to at least one of an interaction by a user of one of the plurality of user devices with another user of another one of the plurality of user devices, an interaction by the user with an LBC effect presently instantiated at the LBC interaction zone, one or more interactions by the user with one or more LBC effects previously instantiated at one or more LBC interaction zones, or an interaction by the user with the real-world story venue.

18. The method of claim 11, wherein the storytelling system further comprises a user database accessible by the computing platform, the user database storing a user model associated with a user of the user device, the method further comprising:

selecting, by the software code executed by the hardware processor and using at least one of a known user preference or an inferred user preference included in the user model associated with the user device, the one or more of the at least one LBC effect associated with the active story arc for distribution to the designated one of the plurality of LBC effects databases.

19. The method of claim 18, further comprising:

predicting, by the software code executed by the hardware processor and using the story template and the user model associated with the user of the user device, at least one next active story arc and at least one next destination LBC interaction zone for the user within the real-world story venue;

designating, by the software code executed by the hardware processor and based on proximities to the predicted at least one next destination LBC interaction zone, at least one of the plurality of LBC effects databases for supporting the predicted at least one next active story arc at the predicted at least one next destination LBC interaction zone; and distributing, by the software code executed by the hardware processor, at least one other LBC effect associated with the predicted at least one next active story arc to the designated at least one of the plurality of LBC effects databases for supporting the predicted at least one next active story arc prior to arrival of the user device at the predicted at least one next destination LBC interaction zone.

20. The method of claim 11, further comprising:

receiving, by the software code executed by the hardware processor, another story selection data from another user device;

obtaining, by the software code executed by the hardware processor, another story template corresponding to the another story selection data, the another story template including a plurality of story arcs each associated with at least one LBC effect;

identifying, by the software code executed by the hardware processor, a location of the another user device within the real-world story venue;

determining, by the software code executed by the hardware processor, using the location of the another user device, one of the plurality of story arcs of the another story template as an active story arc of the another story template;

identifying, by the software code executed by the hardware processor, another LBC interaction zone within the real-world story venue for the at least one LBC effect associated with the active story arc of the another story template;

designating, by the software code executed by the hardware processor, based on proximities to the another LBC interaction zone, one of the plurality of LBC servers and one of the plurality of LBC effects databases for supporting the active story arc of the another story template;

distributing, by the software code executed by the hardware processor, the at least one LBC effect associated with the active story arc of the another story template to the designated one of the plurality of LBC effects databases for supporting the active story arc of the another story template; and enabling instantiation, by the designated one of the plurality of LBC servers for supporting the active story arc of the another story template, of the at least one LBC effect associated with the active story arc of the another story template at the another LBC interaction zone.

* * * * *